United States Patent [19]

Ohkuni et al.

[11] Patent Number: 4,706,724
[45] Date of Patent: Nov. 17, 1987

[54] PNEUMATIC TIRES FOR MOTORCYCLES

[75] Inventors: Shinichiro Ohkuni, Akishima; Shinichi Tamada, Sayama, both of Japan

[73] Assignee: Bridgestone Tire Company Limited, Tokyo, Japan

[21] Appl. No.: 806,134

[22] Filed: Dec. 9, 1985

Related U.S. Application Data

[63] Continuation of Ser. No. 691,351, Jun. 7, 1984, abandoned, which is a continuation of Ser. No. 483,035, Apr. 7, 1983, abandoned.

[30] Foreign Application Priority Data

Apr. 23, 1982 [JP] Japan .................................. 57-077

[51] Int. Cl.$^4$ .................. B60C 15/00; B60C 15/06
[52] U.S. Cl. .................................. 152/454; 152/527; 152/531; 152/535; 152/541; 152/546; 152/554
[58] Field of Search .................. 152/209 R, 450, 451, 152/454, 526, 527–538, 541, 542, 543, 554, 546

[56] References Cited

U.S. PATENT DOCUMENTS 3,842,879 10/1974 Mills et al. .................... 152/209 R
3,881,538 5/1975 Mirtain ........................ 152/361 DM
3,961,657 6/1976 Chrobak ....................... 152/352 R
4,215,735 8/1980 Sato .............................. 152/361 DM

FOREIGN PATENT DOCUMENTS 1222759 2/1971 United Kingdom ............ 152/356 R

Primary Examiner—Michael Ball
Attorney, Agent, or Firm—Sughrue, Mion, Zinn, Macpeak & Seas

[57] ABSTRACT

A pneumatic tire for motorcycles is disclosed, which comprises a tread portion defining a maximum width of the tire, a pair of sidewall portions, a pair of bead portions, a carcass of radial or semi-radial structure composed of at least one rubberized cord ply containing organic fiber cords therein, and a belt superimposed about a crown region of the carcass and composed of at least one cord layer containing cords with a modulus of elasticity of at least 600 kgf/mm$^2$ arranged at an angle of not more than 30° with respect to the equatorial plane of the tire, and has an aspect ratio of not more than 86%. In this tire, a ratio of a distance between a radial height of the sidewall portion and a position of a maximum width of the carcasss to a radial height of the sidewall portion is not more than 20%, and both end portions of at least one rubberized cord layer constituting the carcass are wound around bead rings from inside toward outside to form turnups, and a stiffener inclusive of a tapered rubber filler having a Shore A hardness of at least 60° is disposed from an upper part of bead ring toward the tread portion.

4 Claims, 2 Drawing Figures

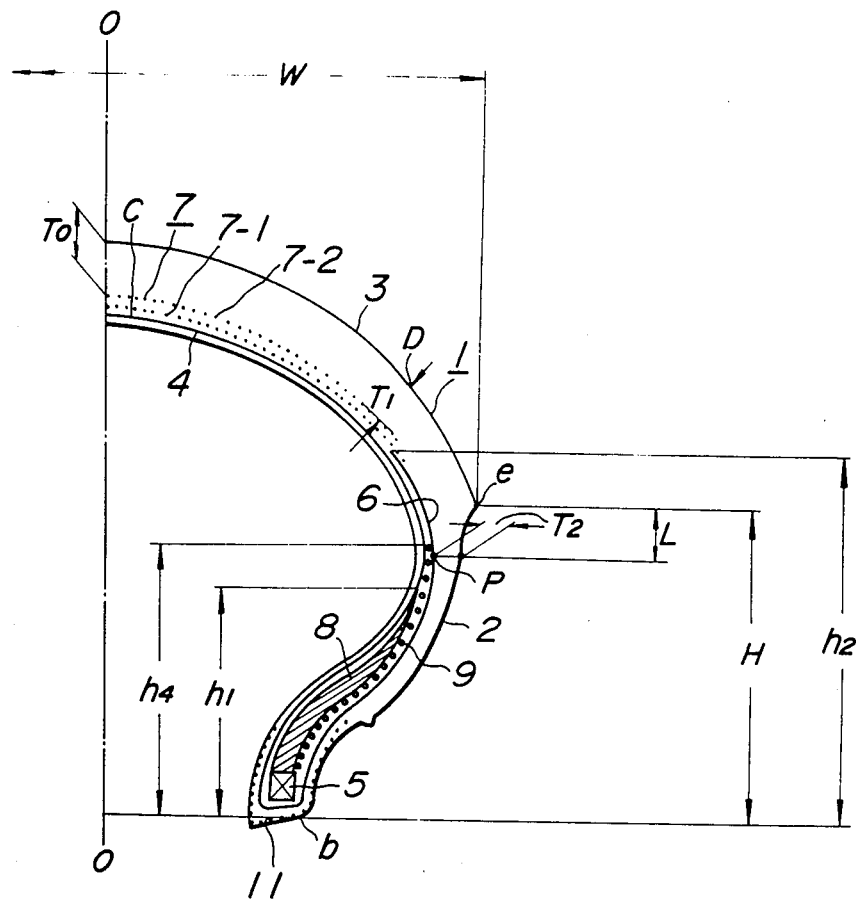
FIG_2

PNEUMATIC TIRES FOR MOTORCYCLES

This is a continuation application of Ser. No. 691,351 filed on June 7, 1984, now abandoned, which is a continuation of application Ser. No. 483,035 filed on Apr. 7, 1983, now abandoned.

This invention relates to pneumatic tires for motorcycles, and more particularly to pneumatic tires for motorcycles comprising a carcass of radial or semi-radial structure.

In general, radial tires have a structure that a carcass is composed of one or few rubberized plies each containing fiber cords or metal cords therein, whose cords are arranged in a direction perpendicular to the equatorial plane of the tire (i.e. in a radial direction). A belt is arranged between the carcass and tread portion and is composed of plural inextensible cord layers each containing metal cords arranged in parallel with or inclined at a small angle with respect to the equatorial plane of the tire, the cords of which being crossed with each other. Moreover, tires having a structure where only the carcass in the above structure is composed of plural rubberized plies each containing cords inclined at an angle of about 75° with respect to the equatorial plane of the tire, the cords of which being crossed with each other, are called semi-radial tires in order to distinguish from the radial tire.

Generally, it is well-known that radial and semi-radial tires exhibit excellent performances such as high-speed durability, wet skid resistance, road-gripping property and the like because the belt serves to give a higher rigidity in a crown portion of the carcass as compared with previously used bias tires (i.e. tire having a structure that the carcass is composed of plural rubberized plies each containing fiber cords inclined at an angle of about 35° with respect to the equatorial plane of the tire, the cords of which being crossed with each other). This fact is applied only to tires for four-wheeled vehicles.

When the carcass of radial or semi-radial structure as described above is applied to tires for two-wheeled vehicles or motorcycles, however, the stiffness of tire sidewall portion becomes relatively weak owing to the strong road-gripping force especially in inclined state, which causes troubles in the steering stability. Therefore, the application of the radial or semi-radial carcass structure has been ignored up to now.

It is, therefore, an object of the invention to improve the weak stiffness of the sidewall portion, which is a factor for unstable steering, and to apply the merits of the radial and semi-radial carcass structures to tires for motorcycles.

According to the invention, there is provided in a pneumatic tire for motorcycles comprising a tread portion extending over a region for defining a maximum width of the tire, a pair of sidewall portions extending inwardly from both ends of said tread portion, a pair of bead portions at inner edges of said sidewall portions, a carcass reinforcing these portions and composed of at least one rubberized cord ply containing organic fiber cords arranged at an angle of 50°-90° with respect to the equatorial plane of the tire, and a belt disposed between said tread portion and a crown region of said carcass and composed of at least one cord layer containing cords with a modulus of elasticity of at least 600 kgf/mm$^2$ arranged at an angle of not more than 30° with respect to the equatorial plane of the tire, and having an aspect ratio of not more than 86%, the improvement wherein a ratio (L/H) of a distance L between a radial height of said sidewall portion and a position of a maximum width of said carcass to a radial height H of said sidewall portion is not more than 20%, and both end portions of at least one rubberized cord ply constituting said carcass are wound around bead rings at said bead portions from inside toward outside in a direction of rotational axis of the tire to form turnups, and a stiffener inclusive of a tapered rubber filler having a Shore A hardness of at least 60° disposed from an upper part of said bead ring toward said tread portion.

BRIEF DESCRIPTION OF THE DRAWING

The invention will now be described in detail with reference to the accompanying drawings, wherein:

FIGS. 1 and 2 are radial half sections of embodiments of the pneumatic tire for motorcycle according to the invention, respectively.

DESCRIPTION OF THE PREFERRED EMBODIMENTS

Figure 1:
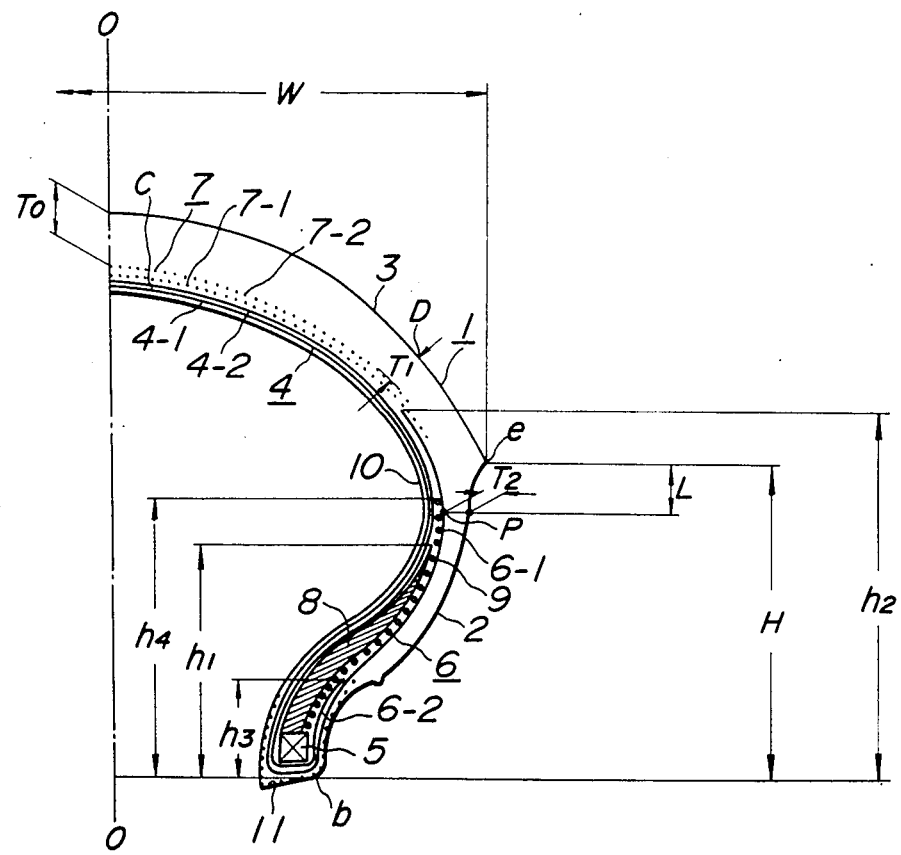

In the pneumatic tire for motorcycles, the tread portion reinforced with the carcass is necessary to extend over a region corresponding to the maximum width of the tire in view of its running performance. When the radial or semi-radial carcass structure is used as a reinforcement for the tread portion as well as the sidewall portion, the tread portion is further reinforced with the belt. In this case, for cords to be used in the belt it is necessary to have a modulus of elasticity of not less than 600 kgf/mm$^2$. In order to achieve the object of the invention under such a reinforcement for the tire body, the aspect ratio of the tire, i.e. a ratio of tire height to maximum tire width should be not more than 86%. When the aspect ratio exceeds 86%, the radial height H of the sidewall portion is too high and consequently the stiffness of the sidewall portion becomes weak.

Furthermore, it has been elucidated by the inventors that a ratio of a distance (L) between a radial height of the sidewall portion and a position of a maximum width of the carcass to a radial height (H) of the sidewall portion should be not more than 20%. Moreover, in order to improve the weak stiffness of the sidewall portion, it is necessary that both end portions of at least one rubberized cord ply constituting the carcass are wound around bead rings located in the bead portions for inside toward outside in a direction of rotational axis of the tire to form turnups and further a stiffener inclusive of a tapered rubber filler having a Shore A hardness of at least 60° is disposed from an upper part of the bead ring toward the tread portion.

FIG. 1 illustrates a radial half section of a first embodiment of the pneumatic tire for motorcycle according to the invention. In this tire 1, the aspect ratio is 80%. While only right half section of the tire is illustrated with respect to an equatorial plane O—O of the tire, it is to be understood that the half not illustrated is identical to that illustrated but opposite in hand.

The tire 1 comprises a pair of bead portions, a pair of sidewall portions 2 and a tread portion 3, these portions being connected toroidally to each other. The sidewall portion 2 and the tread portion 3 are reinforced with a carcass 4 as a whole. In this case, a distance L between a radial height H of the sidewall portion 2 and a position P of a maximum width of the carcass 4 has a relation of L/H=15% with respect to the radial height H of the sidewall portion 2.

In the maximum width position of the carcass, the thickness $T_2$ of the sidewall portion is within a range of 4–8 mm, preferably 5–7 mm. In the illustrated embodiment, the thickness of the sidewall portion is 5 mm.

In FIG. 1, the carcass 4 is composed of two rubberized cord plies 4-1 and 4-2, both end portions of which are wound around bead rings 5 located at radially inner edges of the sidewall portions 2 from inside toward outside in a direction of rotational axis of the tire to form turnups 6.

According to the invention, the carcass 4 is composed of one or several rubberized cord plies each containing organic fiber cords such as nylon, rayon, polyester or the like arranged at an angle of 50°–90° with respect to the equatorial plane O—O, both end portions of at least one cord ply of which are wound around bead rings 5 toward outside in the direction of the rotational axis of the tire to form the turnups 6. In the illustrated embodiment, the carcass 4 is composed of two cord plies 4-1 and 4-2, each of which is wound outwardly around the bead ring 5 to form higher turnup 6-1 and lower turnup 6-2, respectively.

The tread portion 3 extends from the position of the equatorial plane O—O toward either side and its width W extending between both side edges e forms a maximum width of the tire.

Concerning rubber thickness, the tread portion 3 has a ratio of thickness $T_1$ at a point corresponding to $\frac{1}{8}$ of peripheral length of the tread portion remote from the side edge e thereof (hereinafter referred to as $\frac{1}{8}$ tread point and represented by D) to thickness $T_0$ at the equatorial plane of 71%. The ratio of rubber thickness of the tread portion $(T_1/T_0)$ is within a range of 45–90%, preferably 65–80%.

A belt 7 is disposed on a crown region C of the carcass beneath the tread portion 3 for reinforcing a crown region C of the tread portion 3. In this case, both ends of the belt 7 may extend somewhat over the side edges e of the tread portion 3 into the sidewall portions 2, but it is preferable to terminate both ends of the belt 7 short of the side edges e of the tread portion 3 as shown in FIG. 1. The belt 7 is composed of at least one cord layer containing cords with a modulus of elasticity of at least 600 kgf/mm² arranged at an angle of not more than 30° with respect to the equatorial plane O—O. When the belt 7 is composed of plural cord layers, the cords of these layers are crossed with each other at an angle of 15°–30° with respect to the equatorial plane or arranged in substantially parallel with the equatorial plane.

The term "modulus of elasticity" of cord to be used in the belt is defined by $E_c$ calculated by the following equation when a relation between load and elongation is measured by applying a tensile force to the cord and a rising slope of the measured load-elongation curve is extended from this curve to determine a load (kgf) at 10% elongation:

$$E_c = \frac{F \times 10}{S}$$

wherein F is a load at 10% elongation and S is a sectional area (mm²) of cord. According to the invention, the modulus of elasticity of the cord is not less than 600 kgf/mm².

In this connection, the modulus of elasticity of each of conventionally known cords is exemplified as follows:

| Nylon-6 | 285 kgf/mm² |
| Nylon-66 | 345 kgf/mm² |
| Polyester | 456 kgf/mm² |
| High-modulus polyester*[1] | 600 kgf/mm² |
| Rayon | 650 kgf/mm² |
| Kevlar*[2] | 3,700 kgf/mm² |
| Steel | 16,000 kgf/mm² |

*[1]cord of low polymerization degree polyethylene tetephthalate having an intrinsic viscosity of 0.3–0.8 as measured in a solvent of o-chloro-phenol at a temperature of 25° C.;
*[2]trade name of aromatic polyamide fiber cord, made by Du Pont Nemours, E.I.

In the illustrated embodiment, the belt 7 is composed of two cord layers 7-1 and 7-2. For the reinforcing member for the belt, there are considered; the case of using metal cords or fiber cords alone in both the layers 7-1 and 7-2, the case of using fiber cords in the layer 7-1 and using metal cords in the layer 7-2, the case of using metal cords in the layer 7-1 and using fiber cords in the layer 7-2, and the like. In any case, it is necessary that at least one cord layer constituting the belt has a modulus of elasticity of cord of not less than 600 kgf/mm².

For the metal cord, it is desirable to use steel cord obtained by twisting 6 to 25 steel filaments, each having a diameter of not more than 0.15 mm, with each other. Specifically, the diameter of the steel filament is 0.15 mm, 0.12 mm or 0.10 mm. Furthermore, when the metal cord is used in the cord layers for the belt, it is preferable to arrange the metal cords at a spacing ratio of 35–65%, and in this case the flexural rigidity of the cord in the thickness direction of the belt is not increased excessively. The spacing ratio of metal cords is defined by the following equation:

$$\text{Spacing ratio} = f - d/f \times 100(\%)$$

wherein f is a center distance between cords and d is a diameter of cord.

In the illustrated embodiment, a tapered rubber filler extending from the upper part of the bead ring 5 toward the tread portion 3 is disposed as a stiffener 8 between the carcass 4 and the turnup 6 thereof. The rubber filler has a Shore A hardness of at least 60°, preferably not less than 65°. The upper limit of the hardness is not critical in view of tire performances, but when the hardness is higher than about 98°, the working efficiency becomes undesirably poor in view of tire production.

For the stiffener 8, there is preferably used a composite structure of the rubber filler and a cord reinforcing layer 9 wherein the cord reinforcing layer 9 is arranged along the rubber filler from the upper part of the bead ring 5 toward the tread portion 3. In the cord reinforcing layer 9, the fiber or metal cords are arranged at an inclination angle of 15°–30° with respect to a tangent of a concentric circle of the tire passing a radially inner end of the cord reinforcing layer 9 at an intersection of the circle with the cord of the layer 9. The cord reinforcing layer 9 may be arranged alone or together with the rubber filler outside the turnup 6 in its axial direction. However, it is desirable to arrange the cord reinforcing layer 9 together with the rubber filler between the carcass 4 and the turnup 6 thereof to adjoin the cord reinforcing layer 9 to the turnup 6 as shown in FIG. 1.

When radial heights extending from the bead base b to ends in tread direction of the rubber filler, turnups 6-1, 6-2 and cord reinforcing layer 9 are $h_1$, $h_2$, $h_3$ and $h_4$, respectively. A height of the sidewall portion expressed by a radial distance from the bead base b to the side edge e of the tread portion 3 is designated as H. At least one of heights $h_1$, $h_2$, $h_3$ and $h_4$ according to the invention is preferable to be at least 60% of the height H of the sidewall portion.

In the embodiment of FIG. 1, the heights $h_1$, $h_2$, $h_3$ and $h_4$ are 75%, 119%, 30% and 94% with respect to the height H of the sidewall portion, respectively, among which $h_1$, $h_2$ and $h_4$ exceed the standard value of 60% and the height $h_1$ of the rubber filler is high level, so that a flex zone 10 is forced toward the tread portion 3 and at the same time the deformation of the flex zone 10 itself is restrained by overlapping the end part of the turnup 6 with the belt 7. Furthermore, it is desirable that at least one of the height $h_1$ of the rubber filler and the height $h_4$ of the cord reinforcing layer 9 is within a range of 50-75% of the radial height H of the sidewall portion. In the illustrated embodiment, the heights $h_1$ and $h_4$ are 75% and 94% of the height H, respectively as previously mentioned.

In FIG. 1, reference numeral 11 is a chafer composed of fiber cords or a woven fabric serving to prevent rim chafing and to reinforce the lower part of the sidewall portion.

In FIG. 2 is shown a radial right-half section of another embodiment of the pneumatic tire for motorcycle according to the invention. While only the right half section of the tire is illustrated with respect to an equatorial plane O—O of the tire, it is to be understood that the half not illustrated is the same as that illustrated but opposite in hand.

The tire 1 comprises a pair of bead portions, a pair of sidewall portions 2 and a tread portion 3, these portions being connected toroidally to each other. The sidewall portion 2 and the tread portion 3 are reinforced with a carcass 4 as a whole, both end portions of which are wound around bead rings 5 located at radially inner edges of the sidewall portions 2 from inside toward outside to form turnups 6.

According to the invention, the carcass 4 has a so-called radial structure composed of at least one rubberized cord ply containing organic fiber cords such as nylon, rayon, polyester or the like arranged at an angle of about 90° with respect to the equatorial plane O—O. Although FIG. 2 shows the carcass 4 composed of single cord ply, it is a matter of course that the carcass is composed of plural cord plies in accordance with the tire size or use purposes. The tire construction of FIG. 2 is the same as described in FIG. 1 except the structure of the carcass.

A semi-radial tire (Tire A) and two radial tires (Tires B and C) were manufactured together with the conventional radial tire (Control tire) according to tire dimensions shown in the following Table. Each of these tires was actually run on a circuit course of 4.3 km at a speed of 200 km/hr at maximum, during which a susceptibility to disturbance (weak stiffness feeling) was evaluated by a driver's feeling to obtain a result as shown in the table, wherein the weak stiffness feeling was indicated by an index for steering stability on the basis that the control tire is 100.

Moreover, the control tire had a size of 3.00 H 19 for front wheel and 4.00 H 18 for rear wheel, while each of the tires A-C had a size of 90/80-19 for front wheel and 120/80-18 for rear wheel. In these tires, the internal pressure was 2.0 kg/cm² for front wheel and 2.2 kg/cm² for rear wheel, respectively.

|  |  | Control tire | Tire A FIG. 1 | Tire B FIG. 2 | Tire C FIG. 2 |
|---|---|---|---|---|---|
| Height of sidewall |  | 68 mm | | 53 mm | |
| Aspect ratio |  | 95% | | 80% | |
| L/H of sidewall |  | 30% | | 15% | |
| Belt | cord material | 0.25 mmφ · steel strand construction 1 × 5 | | | |
|  | cord angle | 20° (two layers) | | | |
|  | width of layer 7-1 | 130 mm | | | |
|  | width of layer 7-2 | 110 mm | | | |
| Carcass | cord material | polyester cord of 1,500 d/2 | | | |
|  | cord angle | 90° (1 ply) | 75° (2 plies) | 90° (1 ply) |  |
|  | turnup height $h_2$ of ply 4-1 | 35 mm | 63 mm | | 35 mm |
|  | turnup height $h_2$ of ply 4-2 |  | 15 mm | | |
| Tread portion | width W | 150 mm | | | |
|  | Thickness $T_0$ | 8 mm | | | |
|  | Thickness $T_1$ | 8 mm | 6 mm | 6 mm | 8 mm |
| Height $h_1$ of rubber filler having Shore A hardness of 62° |  | 30 mm | 40 mm | 40 mm | 30 mm |
| Height $h_4$ of cord reinforcing layer 10 |  |  | 50 mm | 50 mm |  |
| Weak stiffness feeling |  | 100 | 76 | 79 | 89 |

(The small the index value of weak stiffness feeling, the better the steering stability)

As apparent from the above table, the steering stability is considerably improved in the tires according to the invention as compared with the control tire, from which it can be seen that according to the invention, the radial or semi-radial carcass structure can advantageously be applied to the pneumatic tire for motorcycles.

What is claimed is:

1. A pneumatic tire used on the road for motorcycles comprising; a tread portion extending over a region for defining a maximum width of the tire, a pair of sidewall portions extending inwardly from both ends of said tread portion, a pair of bead portions at inner edges of said sidewall portions, a toroidal carcass reinforcing these portions and composed of at least one rubberized cord ply containing organic fiber cords arranged at an angle of 50°-90° with respect to the equatorial plane of the tire, both end portions of said cord ply being wound around bead rings to form turnups at said a bead portions, a belt disposed between said tread portion and a crown region of said carcass and composed of at least one cord layer containing aromatic polyamide fiber cords arranged at an angle of not more than 30° with respect to the equatorial plane of the tire, and having an aspect ratio of not more than 86%, a ratio (L/H) of a radial distance L between an edge e of the tread and a position P of a maximum width of said carcass to a radial height H of said sidewall portion is not more than 20%, a stiffener inclusive of a tapered rubber filler having a Shore A hardness of at least 60° disposed between said carcass and said turnup thereof within a range of 50-75% of a radial height of the sidewall portion from an upper part of said bead ring, each of said sidewall portions having a rubber thickness of 4-8 mm at a position corresponding to said maximum width of said carcass, wherein a radial height extending from the bead base to an end in the tread direction of said turnup of said carcass is at least 60% of the radial height of said sidewall portion so as to provide gradually decreasing stiffness thereamong, and said tread portions has a rubber thickness ($T_o$) being thickest at a widthwise center of said tread portion and gradually reducing toward a point (D) corresponding to ⅛ of a peripheral length of said tread portion remote from the side edge thereof, and a thickness ($T_1$) of rubber of said tread portion at said point (D) has a ratio of 45-90% of said rubber thickness ($T_o$) at the center of said tread portion.

2. The pneumatic tire according to claim 1, wherein said belt is composed of two cord layers, the cords of which being cross with each other at an angle of 15°-30° with respect to the equatorial plane of the tire.

3. The pneumatic tire according to claim 1, wherein cords of said belt are arranged in substantially parallel with the equatorial plane of the tire.

4. A pneumatic tire according to claim 1, wherein said stiffener is a composite structure of said rubber filler and at least one cord reinforcing layer containing cords arranged at an inclination angle of 15°-30° with respect to the circumferential line of the tire.

* * * * *

UNITED STATES PATENT AND TRADEMARK OFFICE
CERTIFICATE OF CORRECTION

PATENT NO. : 4,706,724

DATED : November 17, 1987

INVENTOR(S) : Ohkuni et al

It is certified that error appears in the above-identified patent and that said Letters Patent is hereby corrected as shown below: Title page:

Item [30], line 2, change "57-077" to -- 67-077 --.

Signed and Sealed this

Thirty-first Day of May, 1988

Attest:

DONALD J. QUIGG

*Attesting Officer*  Commissioner of Patents and Trademarks

UNITED STATES PATENT AND TRADEMARK OFFICE
CERTIFICATE OF CORRECTION

PATENT NO. : 4,706,724
DATED : November 17, 1987
INVENTOR(S) : Ohkuni et al

It is certified that error appears in the above-identified patent and that said Letters Patent is hereby corrected as shown below:

On the title page, Item (30) line 2, "57-077" should read --57-67-077--.

This certificate supersedes Certificate of Correction issued May 31, 1988.

Signed and Sealed this

Twenty-fifth Day of October, 1988

Attest:

DONALD J. QUIGG

*Attesting Officer*   *Commissioner of Patents and Trademarks*